(12) United States Patent
Komatsu et al.

(10) Patent No.: US 11,537,216 B2
(45) Date of Patent: *Dec. 27, 2022

(54) SYSTEM INCLUDING TOUCH IC AND EXTERNAL PROCESSOR, AND TOUCH SENSOR INCLUDING TOUCH IC

(71) Applicant: Wacom Co., Ltd., Saitama (JP)

(72) Inventors: Hideyuki Komatsu, Saitama (JP); Kazuhiro Miyoshi, Saitama (JP); Shigeyuki Sano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,953

(22) Filed: Nov. 22, 2021

(65) Prior Publication Data

US 2022/0083154 A1 Mar. 17, 2022

Related U.S. Application Data

(63) Continuation of application No. 17/099,408, filed on Nov. 16, 2020, now Pat. No. 11,181,989, which is a
(Continued)

(30) Foreign Application Priority Data

Jun. 25, 2018 (JP) .............................. JP2018-120193

(51) Int. Cl.
*G06F 3/03* (2006.01)
*G06F 3/044* (2006.01)
(Continued)

(52) U.S. Cl.
CPC ........ *G06F 3/0317* (2013.01); *G06F 3/03545* (2013.01); *G06F 3/0446* (2019.05);
(Continued)

(58) Field of Classification Search
CPC .. G06F 3/0317; G06F 3/0446; G06F 3/04164; G06F 3/04162; G06F 3/03545;
(Continued)

(56) References Cited

U.S. PATENT DOCUMENTS 9,182,872 B2 11/2015 Sugiyama
2014/0104208 A1* 4/2014 Lee ...................... G06F 3/0445
345/173

(Continued)

FOREIGN PATENT DOCUMENTS

JP 2014-21937 A 2/2014
JP 2014-199495 A 10/2014
(Continued)

OTHER PUBLICATIONS

International Search Report, dated Jul. 9, 2019, for International Application No. PCT/JP2019/022686, 2 pages.

*Primary Examiner* — Koosha Sharifi-Tafreshi
(74) *Attorney, Agent, or Firm* — Seed IP Law Group LLP (57) ABSTRACT

A touch sensor includes a sensor electrode group; and a touch integrated circuit coupled to the sensor electrode group for executing touch detection and configured to generate frame data indicative of a detection level of each of two-dimensional positions in the sensor electrode group. The touch integrated circuit is connected to an external processor different from the touch integrated circuit via a first bus. The touch integrated circuit supplies the frame data to the external processor via the first bus. The external processor feeds determination data resulting from performing predetermined processing on the frame data back to the touch integrated circuit. The touch integrated circuit performs an operation based on the determination data.

20 Claims, 9 Drawing Sheets

Related U.S. Application Data continuation of application No. PCT/JP2019/022686, filed on Jun. 7, 2019.

(51) Int. Cl.
*G06F 3/041* (2006.01)
*G06F 3/0354* (2013.01)
*H04L 12/40* (2006.01)

(52) U.S. Cl.
CPC ...... *G06F 3/04162* (2019.05); *G06F 3/04164* (2019.05); *H04L 12/40* (2013.01); *G06F 2203/04104* (2013.01)

(58) Field of Classification Search
CPC ....... G06F 2203/04104; G06F 3/04166; G06F 3/04186; H04L 12/40
See application file for complete search history.

(56) References Cited

U.S. PATENT DOCUMENTS

| | | | |
|---|---|---|---|
| 2014/0152601 A1* | 6/2014 | Hung | G06F 3/04886 345/173 |
| 2014/0292679 A1 | 10/2014 | Kida et al. | |
| 2015/0091837 A1* | 4/2015 | Srinivasan | G06F 3/0488 345/174 |
| 2015/0277601 A1 | 10/2015 | Tahara et al. | |
| 2016/0077663 A1 | 3/2016 | Durojaiye et al. | |
| 2016/0170548 A1 | 6/2016 | Suzuki | |
| 2017/0255320 A1 | 9/2017 | Kumar et al. | |

FOREIGN PATENT DOCUMENTS

| | | |
|---|---|---|
| JP | 2017-527906 A | 9/2017 |
| JP | 2018-32251 A | 3/2018 |
| WO | 2015/083196 A1 | 6/2015 |

* cited by examiner

SYSTEM INCLUDING TOUCH IC AND EXTERNAL PROCESSOR, AND TOUCH SENSOR INCLUDING TOUCH IC

BACKGROUND

Technical Field

The present disclosure relates to a method performed by a system that includes a touch integrated circuit (IC) and an external processor, the system, and a touch sensor including the touch IC.

Description of the Related Art

Typically, it is a touch IC that performs a position detection process in a position detection system for detecting the position of a finger or an electronic pen on a touch surface. In recent years, the position detection process has come to include complicated processing such as gesture recognition. This makes it increasingly difficult for a simply configured touch IC, devoid of rich computing resources such as large memory capacity or high processor performance, to support the position detection process. Thus, studies have begun on a system that uses an added external processor (an integrated circuit different from the touch IC, such as a central processing unit (CPU), graphical processing unit (GPU), digital signal processor (DSP), or artificial intelligence (AI) processor) to handle the position detection process, which in the past has been supported by the touch IC. This type of system is capable of carrying out advanced processing, such as gesture recognition based on frame data acquired by the touch IC (i.e., detection data covering the entire touch surface).

Examples of this system are disclosed in U.S. Patent Application Publication No. 2017/0255320 (referred to as Patent Literature 1) and U.S. Patent Application Publication No. 2016/0170548 (Patent Literature 2). Specifically, FIG. 3 of Patent Literature 1 discloses a system that has a touch IC (304), which supplies the frame data to a GPU (308) as an external processor to let the GPU (308) calculate the touch position. FIG. 1 of Patent Literature 2 discloses a system including a touch data communication interface, which has a touch IC on the source side and an external processor acting as a DSP on the sink side.

The systems disclosed in Patent Literature 1 and Patent Literature 2 include no arrangements to feed back the result of the processing by an external processor to the touch IC. Since the result of the processing by the external processor cannot be used by the touch IC for operations of touch detection and pen detection, improvements are desired.

Also, data such as the position and writing pressure detected by the touch IC are supplied to a downstream host processor that uses the supplied data to generate ink data, among others. In a case where an external processor is added, the host processor is required to obtain from the added external processor a part of the data that in the past has been acquired collectively from the touch IC. This can affect how the host processor is configured. It is therefore necessary to be able to add an external processor without having to change the configuration of the host processor.

BRIEF SUMMARY

According to a first aspect of the present disclosure, there is provided a method performed by a system that includes a touch IC executing touch detection and an external processor different from the touch IC. The system includes a sensor electrode group connected to the touch IC, and a first bus connecting the touch IC to the external processor. The touch IC generates frame data indicative of a detection level of each of two-dimensional positions in the sensor electrode group, and the touch IC supplies the frame data to the external processor via the first bus. The external processor feeds determination data resulting from performing predetermined processing on the frame data back to the touch IC. The touch IC performs an operation based on the determination data.

According to a second aspect of the present disclosure, there is provided the method according to the first aspect in which the external processor feeds the determination data back to the touch IC via the first bus. The external processor is an AI coprocessor for assisting the touch IC. The system further includes a second bus connecting the touch IC to a host processor. The touch IC reports touch coordinates included in the determination data to the host processor via the second bus.

Thus, according to the first aspect of the present disclosure, the determination data resulting from the processing by the external processor is fed therefrom back to the touch IC. This allows the touch IC to utilize the result of the processing by the external processor.

According to the second aspect of the present disclosure, the touch coordinates derived by the AI coprocessor are supplied to the host processor via the touch IC. This makes it possible to add the external processor without having to change the configuration of the host processor.

DETAILED DESCRIPTION

Some preferred embodiments of the present disclosure are described below in detail with reference to the accompanying drawings.

Figure 1:
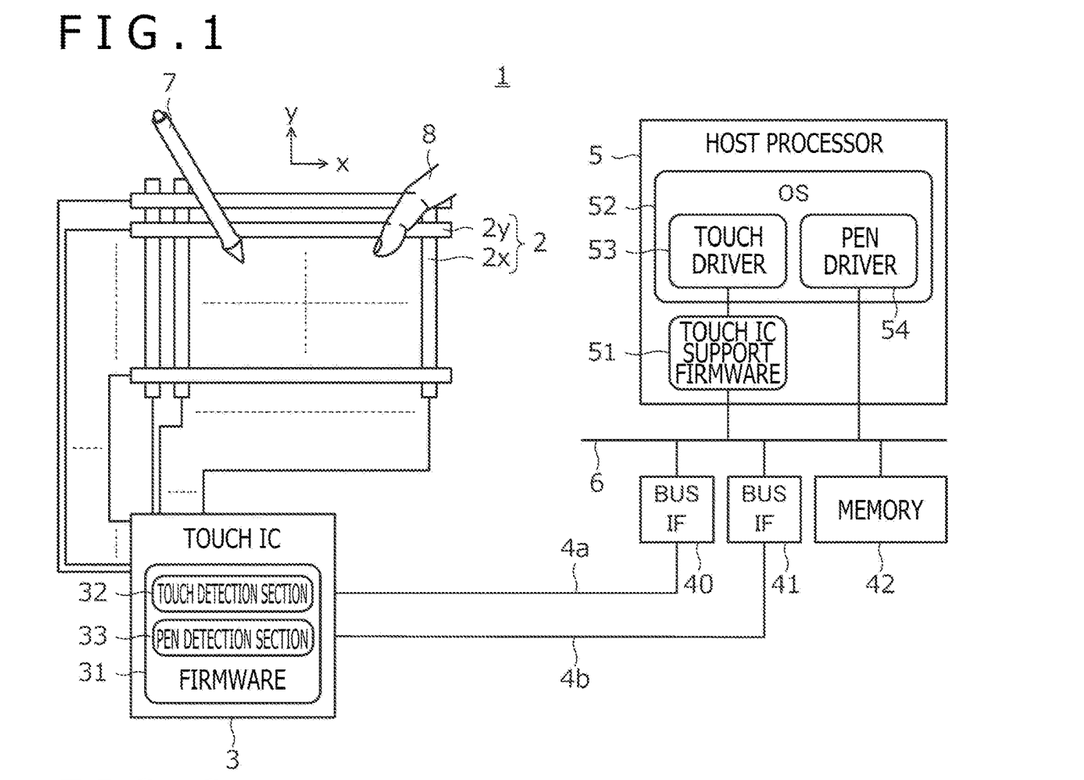
FIG. 1 is a view depicting a configuration of a system in a first embodiment of the present disclosure.

FIG. 1 is a view depicting a configuration of a system 1 in a first embodiment of the present disclosure. As illustrated in FIG. 1, the system 1 is configured with a sensor electrode group 2, a touch IC 3, a dedicated bus 4a (first bus), a peripheral device bus 4b (second bus), bus interfaces 40 and 41, a memory 42, a host processor 5, and an internal bus 6.

The sensor electrode group 2 is made up of multiple sensor electrodes arranged immediately below the touch surface. For example, if the system 1 is a tablet terminal, the sensor electrode group 2 is arranged immediately below the display surface of the terminal that acts as a touch surface. The multiple sensor electrodes constituting the sensor electrode group 2 include multiple X electrodes 2x extending in a y direction each as depicted and arranged at equal intervals in an x direction (perpendicular to the y direction), and multiple Y electrodes 2y extending in the x direction each as depicted and arranged at equal intervals in the y direction.

The touch IC 3 is an integrated circuit that is configured to execute firmware 31 and connected to each of the sensor electrodes making up the sensor electrode group 2. The firmware 31 is configured to implement a touch detection section 32 and a pen detection section 33, the touch detection section 32 performing the operation of detecting an illustrated finger 8 (the operation will be referred to as "touch detection" hereunder), the pen detection section 33 carrying out the operation of detecting an illustrated electronic pen 7 by detecting a pen signal based on electrical charges induced in the sensor electrode group 2 (the operation will be referred to as "pen detection" hereunder).

Figure 2:
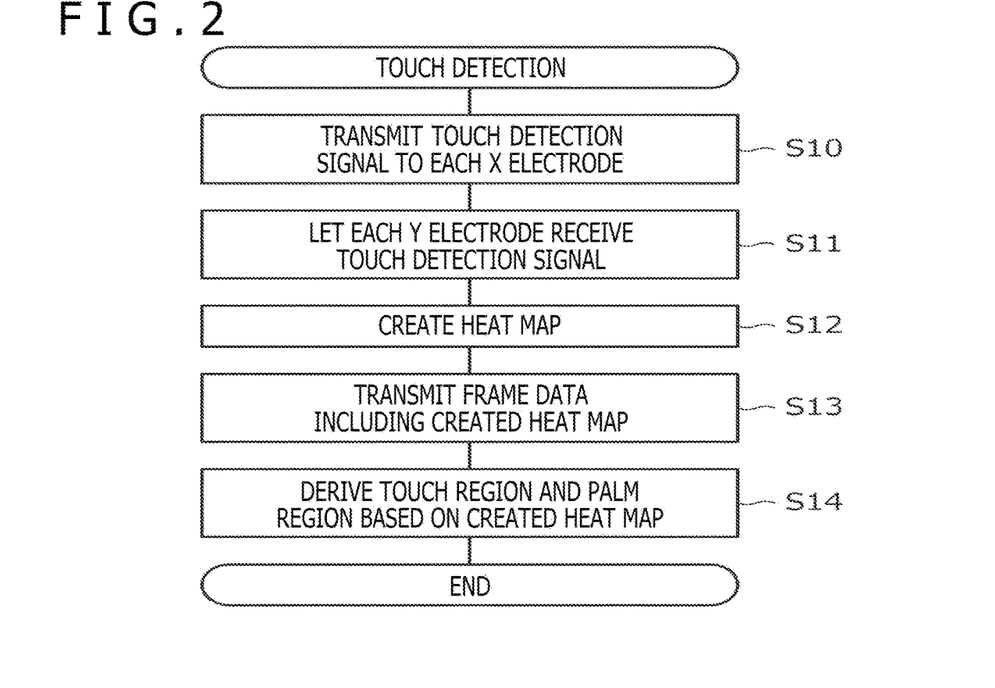
FIG. 2 is a process flowchart detailing touch detection performed by a touch detection section illustrated in FIG. 1.

FIG. 2 is a process flowchart detailing the touch detection performed by the touch detection section 32. As described in FIG. 2, the touch detection section 32 first transmits a touch detection signal to each of the X electrodes 2x (step S10). The touch detection section 32 then receives the touch detection signal from each of the Y electrodes 2y (step S11). On the basis of the result of the reception, the touch detection section 32 creates a heat map indicative of a detection level at each of two-dimensional positions in the sensor electrode group 2 (step S12).

The processing of steps S10 to S12 is explained below in more detail. The touch detection signals are K number of pulse trains, each pulse train including K number of pulses (a pulse is "1" or "−1" data), wherein K represents the number of the X electrodes 2x. The K pulse trains are all different in content (i.e., formed of different combinations of K pulses).

The touch detection section 32 inputs K pulse trains, in parallel, to the X electrodes 2x, one pulse train input to one X electrode (step S10). Every time the pulse train input is made, the touch detection section 32 acquires the value of the current flowing out of each of the Y electrodes 2y (step S11). The current value thus acquired constitutes an inner product between the K number of the pulses making up the input pulse train on one hand, and K number of capacitance values formed at the intersections between the Y electrode 2y in question and the X electrodes 2x on the other hand.

By carrying out the above processing, the touch detection section 32 acquires K number of current values with respect to each Y electrode 2y. For each of the K pulse trains, the touch detection section 32 calculates the inner product between the K number of pulses constituting the pulse train in question on one hand, and the acquired K number of current values on the other hand. By so doing, the touch detection section 32 calculates a detection level at each of the two-dimensional positions in the sensor electrode group 2 (e.g., at the intersection between each X electrode 2x and each Y electrode 2y) (step S12). The above-mentioned heat map is created in this manner.

After generating the heat map, the touch detection section 32 generates frame data that includes the generated heat map, and transmits the frame data to the host processor 5 (step S13).

Also, on the basis of the generated heat map, the touch detection section 32 performs the process of deriving a touch region touched by the finger 8 and a palm region touched not by the finger 8 but by the palm or by the clenched hand of the user (step S14). Specifically, the touch detection section 32 first determines the region of which the capacitance is higher than a predetermined threshold value. If the area of the region is equal to or smaller than a predetermined threshold value, the region is determined to be the touch region. Otherwise, the region is determined to be the palm region. The series of the steps performed so far constitutes and completes a single touch detection process. The touch detection section 32 may also transmit to the host processor 5 the touch region and the palm region acquired in step S14.

Here, the above-mentioned threshold values used by the touch detection section 32 to obtain the touch and palm regions constitute a portion of various parameters employed by the touch detection section 32 for touch detection. The diverse parameters for touch detection may further include: a parameter serving as a determination criterion for labeling (i.e., a process of recognizing adjacent touch regions as the same region; e.g., a process of determining that, if a touch region is adjacent to another region in "n" out of 8 directions, i.e., 2 vertical directions, 2 horizontal directions, and 4 diagonal directions, then the touch regions are recognized as the same region, wherein "n" is used as a determination criterion for this labeling process); a parameter for controlling the content of the touch detection signal; a parameter for controlling the region targeted for touch detection; parameters for controlling at least one sensor electrode in the sensor electrode group 2 used for touch detection; parameters for determining a tracking target in a multiple-touch case; a parameter for controlling the method of determining the palm region; parameters for controlling the content of the data transmitted from the touch detection section 32 to the host processor 5; and parameters for controlling the method of driving the sensor electrode group 2 (e.g., for controlling a waveform, a voltage, and a transmission frequency of the touch detection signal). The touch detection section 32 is configured to control these diverse parameters for touch detection on the basis of touch control data included in the determination data fed back from the host processor 5, as will be discussed later in more detail.

Figure 3:
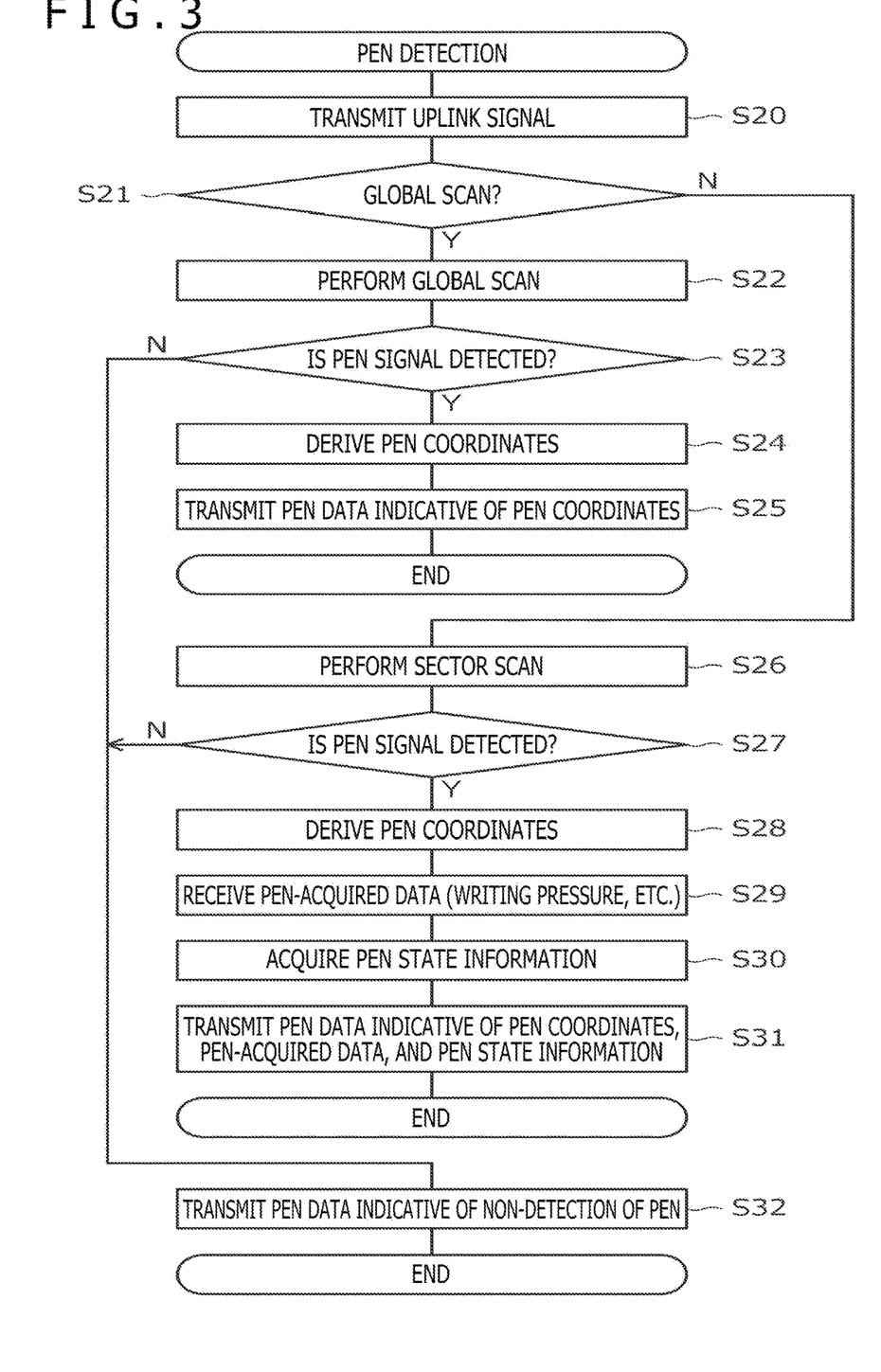
FIG. 3 is a process flowchart detailing pen detection performed by a pen detection section illustrated in FIG. 1.

FIG. 3 is a process flowchart detailing the pen detection performed by the pen detection section 33. As described in FIG. 3, the pen detection section 33 performs the process of transmitting an uplink signal to the electronic pen 7 by first generating the uplink signal and then inputting the generated uplink signal to each of the X electrodes 2x (step S20). The uplink signal is a signal designed to synchronize the electronic pen 7 with the system 1. The uplink signal is also designed to transmit instructions (commands) to the electronic pen 7. The electronic pen 7 is configured to transmit, upon receipt of the uplink signal, an unmodulated burst signal and a data signal modulated with various data (such as writing pressure, side switch ON/OFF information, and pen identification (ID), referred to as "pen-acquired data" hereunder), in that order. The command transmitted by the uplink signal plays the role of advising the electronic pen 7 of the content of the data to be transmitted by the data signal.

The pen detection section 33 proceeds to determine whether or not to perform a global scan (step S21). The determination is made on the basis of pen control data included in the determination data fed back from the host processor 5. The determination will be discussed later in more detail.

Upon determining in step S21 that a global scan is to be performed, the pen detection section 33 carries out the process of scanning all sensor electrodes making up the sensor electrode group 2 (i.e., global scan) at the time the electronic pen 7 is transmitting the pen signal (step S22). The pen detection section 33 determines whether or not the pen signal is detected as a result of the global scan (step S23). At the time of a global scan, the process of demodulating the data signal is not carried out. Only whether or not the pen signal is detected is determined in step S23. When determining in step S23 that the pen signal is not detected, the pen detection section 33 transmits pen data indicating non-detection of the pen to the host processor 5 (step S32). The pen detection section 33 then terminates the pen detection operation.

On the other hand, when determining in step S23 that the pen signal is detected, the pen detection section 33 derives pen coordinates based on the detection level of the pen signal from each of the sensor electrodes (step S24). The pen detection section 33 then transmits the pen data indicating the derived pen coordinates to the host processor 5 (step S25). The pen detection section 33 then terminates the pen detection operation.

Upon determining in step S21 that the global scan is not to be performed, the pen detection section 33 carries out the process of scanning only a predetermined number of sensor electrodes positioned close to the immediately preceding pen coordinates from among the multiple sensor electrodes constituting the sensor electrode group 2 (i.e., sector scan) (step S26). The pen detection section 33 determines whether or not the pen signal is detected as a result of the sector scan (step S27). When determining that the pen signal is not detected, the pen detection section 33 transmits the pen data indicating non-detection of the pen to the host processor 5 (step S32). The pen detection section 33 then terminates the pen detection operation.

On the other hand, when determining in step S27 that the pen signal is detected, the pen detection section 33 derives the pen coordinates based on the detection level of the pen signal from each of the sensor electrodes (step S28). Thereafter, the pen detection section 33 receives pen-acquired data sent from the electronic pen 7 by receiving the data signal using the sensor electrodes closest to the derived pen coordinates and by demodulating the received data signal (step S29).

The pen detection section 33 proceeds to perform the process of acquiring pen state information (step S30). The pen state information represents one of three states: a state in which the electronic pen 7 comes into contact with the touch surface (the "pen-down" state), a state in which the electronic pen 7 that has come into contact with the touch surface continues to stay in contact therewith (the "pen-move" state), and a state in which the electronic pen 7 is detached from the touch surface (the "pen-up" state). Whether or not the electronic pen 7 is in contact with the touch surface is determined by determining whether or not the writing pressure acquired in step S30 exceeds a predetermined threshold value (referred to as "writing pressure ON load" hereunder).

The pen state information acquired in step S30 may include tilt information indicative of the tilt of the electronic pen 7. Specifically, the electronic pen 7 supporting tilt detection is configured to transmit the pen signal from each of two transmission electrodes. The pen detection section 33 is configured to acquire two sets of pen coordinates by deriving them based on each of the two pen signals transmitted from the two transmission electrodes and, based on the distance between the two sets of pen coordinates, to derive the tilt of the electronic pen 7.

After completing step S30, the pen detection section 33 transmits the pen data indicative of the derived pen coordinates, of the received pen-acquired data, and of the acquired pen state information to the host processor 5 (step S31). The pen detection section 33 then terminates the pen detection operation.

Here, the writing pressure ON load used by the pen detection section 33 to acquire the pen state information is part of the diverse parameters used by the pen detection section 33 for pen detection. The various parameters for pen detection may further include: parameters indicative of an operation ratio between the global scan and the sector scan, the ratio being used to forcibly perform the global scan; a parameter representing the detection level of the pen signal for determining whether the pen signal is detected in step S23 or in step S27 of FIG. 3; a parameter representing the frequency of the pen signal; a parameter representing the transmission intensity (amplification level) of the uplink signal; parameters for correcting the pen coordinates derived by the pen detection section 33; and a parameter for correcting the tilt of the electronic pen 7 derived by the pen detection section 33. The pen detection section 33 is configured also to control these various parameters for pen detection on the basis of the pen control data included in the determination data fed back from the host processor 5, as will be discussed later in detail.

Returning to FIG. 1, the host processor 5 acts as a CPU of the system 1. The host processor 5 plays the role of controlling the system 1 as a whole by executing a predetermined operating system (OS) 52. The host processor 5 may include a GPU. The GPU is a processor capable of performing operations more quickly than the CPU in general and thus plays the role of handling processes requiring high-speed computing such as real-time image processing.

The host processor 5 is connected to the bus interfaces 40 and 41 and to the memory 42 via the internal bus 6. The memory 42 stores programs that define the operations of the host processor 5. The host processor 5 reads and executes these programs in order to perform processes, to be discussed later. The memory 42 further plays the role of temporarily or permanently storing diverse data for use by the host processor 5 during processing.

The bus interface 40 is connected to the touch IC 3 via the dedicated bus 4a. The bus interface 41 is connected to the touch IC 3 via the peripheral device bus 4b. In this manner, the host processor 5 is connected to the touch IC 3 through two channels, i.e., the dedicated bus 4a and the peripheral device bus 4b.

The peripheral device bus 4b is a commonly used bus inside the system 1. For example, the peripheral device bus 4b is formed of a universal serial bus (USB). Preferably, the touch coordinates and palm coordinates derived by the touch detection section 32 as well as the pen data acquired by the pen detection section 33 may be transmitted from the touch IC 3 to the host processor 5 via the peripheral device bus 4b. On the other hand, the dedicated bus 4a is provided specifically to transmit and receive the frame data and the determination data including the heat map. In order to send and receive large quantities of data, the dedicated bus 4a is formed of a serial peripheral interface (SPI), for example. Since the amount of the determination data is not as large as that of the heat map, the determination data may alternatively be transmitted from the host processor 5 to the touch IC 3 via the peripheral device bus 4b.

Besides running the operating system 52, the host processor 5 executes the touch IC support firmware (FW) 51 (external processor). The touch IC support firmware 51 is a program that runs on the GPU, for example. The touch IC support firmware 51 performs the process of generating the above-mentioned determination data by carrying out predetermined processes based on the frame data (heat map) and pen data supplied from the touch IC 3, before feeding the generated determination data back to the touch IC 3. Generation and feedback of the determination data will be discussed later in more detail with reference to the accompanying sequence diagrams and process flowcharts.

The predetermined processes performed by the touch IC support firmware 51 include the process of deriving the touch and palm regions based on the heat map and pen coordinates supplied from the touch IC 3. The touch IC support firmware 51 supplies the derived touch and palm regions to a touch driver 53 of the operating system 52.

Figure 4A:
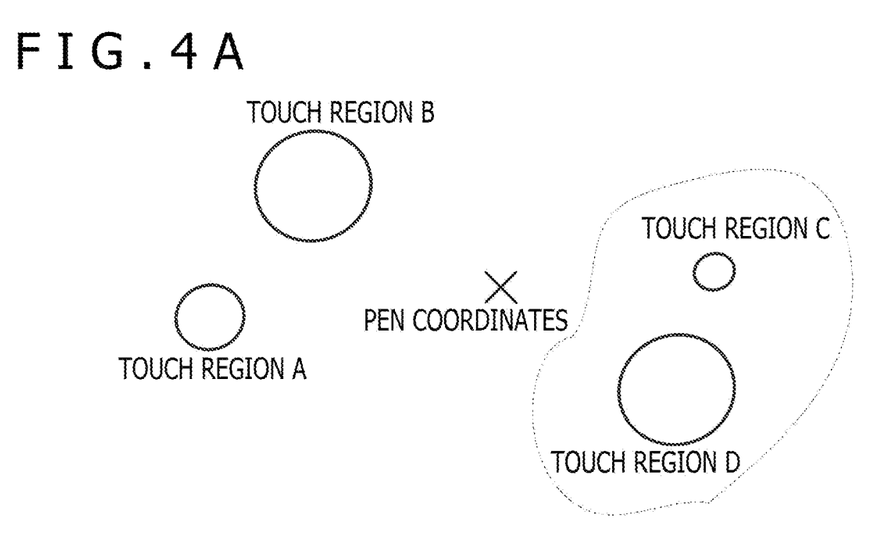
FIG. 4A is a view explaining a palm region derivation process performed by touch IC support firmware illustrated in FIG. 1.

FIG. 4A is a view explaining a palm region derivation process performed by the touch IC support firmware 51. The drawing illustrates a case where four touch regions A to D are derived by the touch IC support firmware 51 and where one set of pen coordinates is supplied from the touch IC 3.

When the user performs input using the electronic pen 7, there is a possibility that the hand of the user holding the electronic pen 7 may come into contact with the touch surface and a touch region may be derived therefrom. The touch region that can be derived in such a case is supposed to be positioned on the right side of the pen coordinates if the user is right-handed or on the left side of the pen coordinates if the user is left-handed. When the user is right-handed, the touch IC support firmware 51 temporarily sets a palm region of a predetermined shape (the range indicated by the broken line in FIG. 4A) on the right side of the pen coordinates, and acquires touch regions included in the temporarily set region as the palm region. In the example of FIG. 4A, touch regions C and D are acquired as the palm region. When the user is left-handed, the touch IC support firmware 51 temporarily sets a palm region of a predetermined shape on the left side of the pen coordinates, and acquires touch regions included in the temporarily set region as the palm region.

In order to perform the above processing, the touch IC support firmware 51 is required beforehand to obtain information indicative of the dominant hand of the user. For example, the touch IC support firmware 51 may have the dominant hand information set thereto beforehand by the user setting parameters indicative of the user's dominant hand (right-handed or left-handed). In another example, the touch IC support firmware 51 may determine whether the user is right-handed or left-handed from the positional relation between the touch region and the pen coordinates.

Figure 4B:
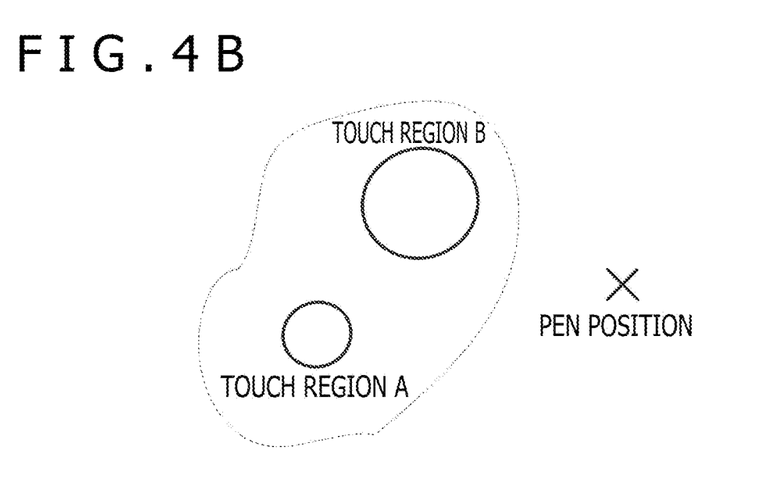
FIG. 4B is a view explaining how the touch IC support firmware typically determines a user's dominant hand.

FIG. 4B is a view explaining how the touch IC support firmware 51 determines a user's dominant hand. In the example of FIG. 4B, two touch regions A and B exist on the left side of the pen coordinates. If the positional relation between the touch regions A and B on one hand and the pen coordinates on the other hand remains unchanged for at least a predetermined time period, the touch IC support firmware 51 determines that the user is left-handed. In this manner, the touch IC support firmware 51 is able to determine the user's dominant hand.

Explained above is the example in which the palm region is derived on the basis of the positional relation with the pen coordinates. Alternatively, the touch IC support firmware 51 may acquire the touch regions, of which the area is equal to or larger than a predetermined value, as the palm region.

Returning to FIG. 1, the operating system 52 includes a touch driver 53 and a pen driver 54. The touch driver 53 plays the role of receiving the touch and palm regions derived by the touch IC support firmware 51, of performing predetermined processes on the received regions, and of transferring what is processed to a rendering application running on the operating system 52 for example. The pen driver 54 plays the role of receiving pen data from the touch IC 3, of performing predetermined processes on the received data, and of transferring what is processed to the rendering application for example. On the basis of the data received from the touch driver 53 and from the pen driver 54, the rendering application generates and renders ink data indicative of the trajectory of the finger 8 or of the electronic pen 7 on the touch surface. This allows the user to verify what was input with the electronic pen 7 or with the finger 8 on the screen.

How the determination data is generated and fed back by the touch IC support firmware 51 is explained below in detail with reference to FIGS. 5 to 8.

Figure 5:
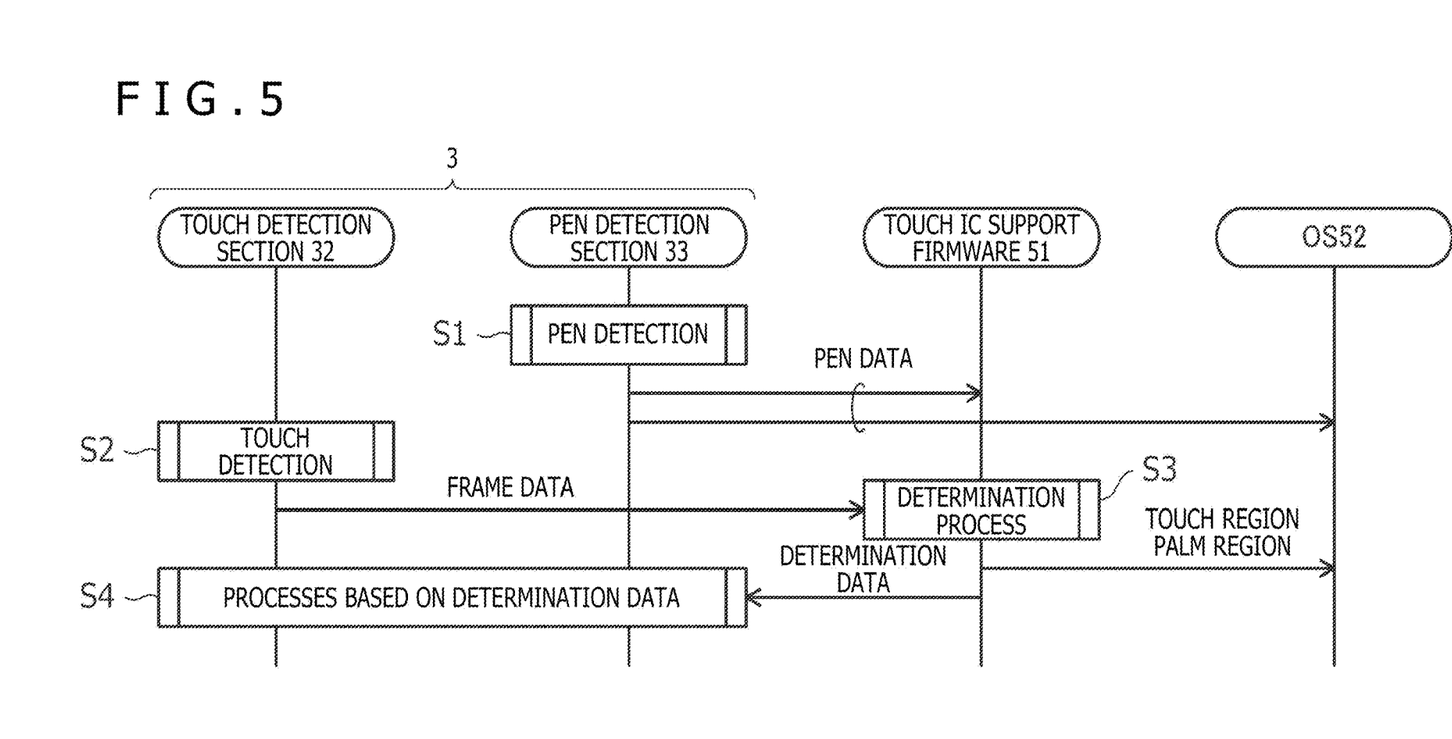
FIG. 5 is a sequence diagram depicting the operations of the system illustrated in FIG. 1.

FIG. 5 is a sequence diagram depicting the operations of the system 1 illustrated in FIG. 1. The touch IC 3 is configured to repeatedly perform the pen detection with the pen detection section 33 (step S1) and the touch detection with the touch detection section 32 (step S2). As will be discussed later in more detail, the execution ratio between steps S1 and S2 (scan scenario) is instructed by the touch IC support firmware 51 to the touch IC 3 using the pen control data (data for controlling the pen detection operation) included in the determination data fed from the touch IC support firmware 51 back to the touch IC 3. The touch IC 3 is configured to carry out steps S1 and S2 in accordance with this instruction.

When executing the pen detection with the pen detection section 33 (step S1), the touch IC 3 supplies the pen data to the touch IC support firmware 51 and to the operating system 52 (more specifically, to the pen driver 54). The pen data is supplied via the peripheral device bus 4b. When executing the touch detection with the touch detection section 32 (step S2), the touch IC 3 supplies the frame data including the heat map to the touch IC support firmware 51. The frame data is supplied via the dedicated bus 4a.

Upon receipt of the pen data and frame data, the touch IC support firmware 51 performs a determination process (step S3). This process generates touch control data that includes touch and palm regions, and determination data that includes the pen control data. The generated determination data is fed back to the touch IC 3 via the dedicated bus 4a or peripheral device bus 4b. The touch and palm regions are also supplied to the operating system 52 (more specifically, to the touch driver 53).

Figure 6:
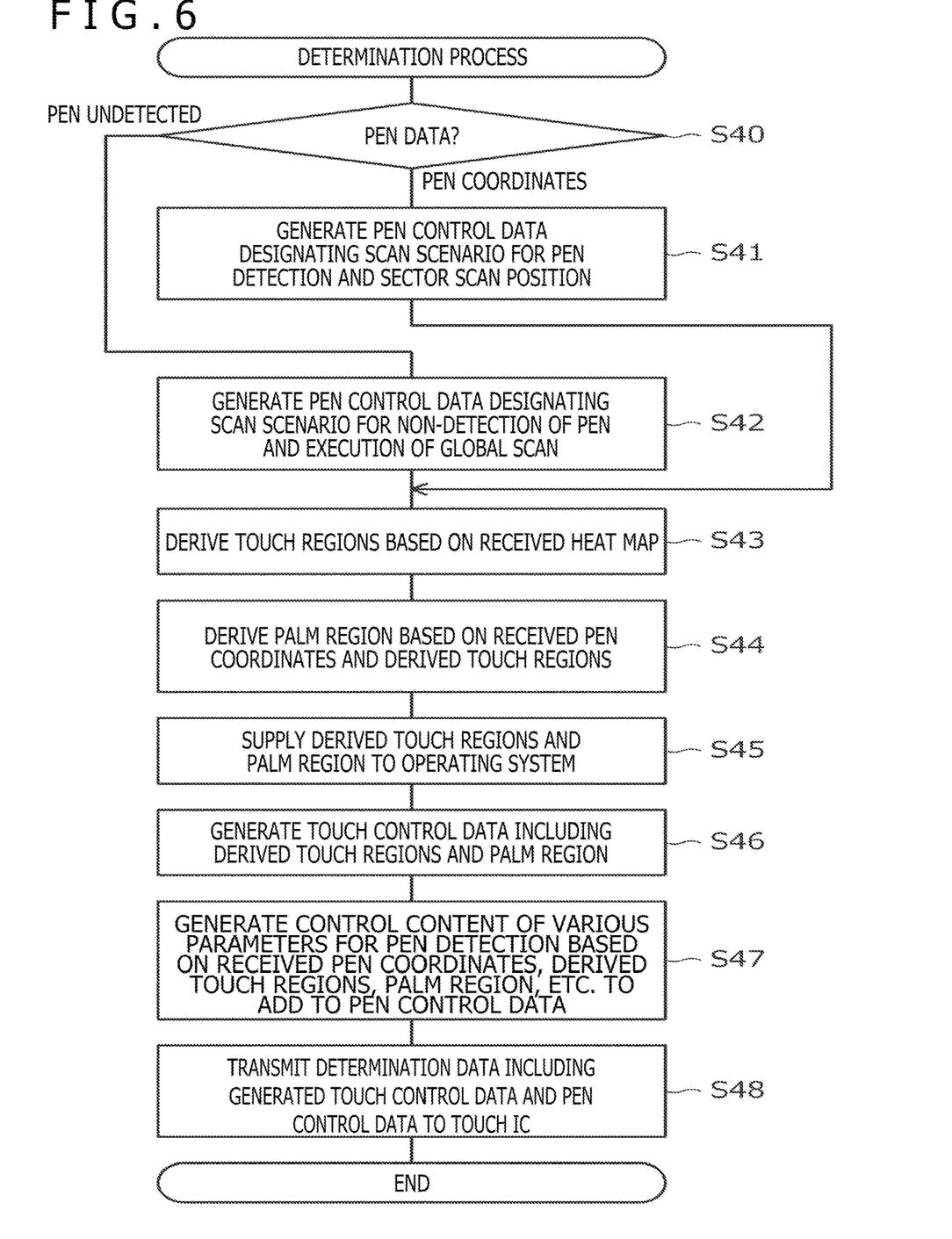
FIG. 6 is a process flowchart detailing a determination process performed in step S3 illustrated in FIG. 5.

FIG. 6 is a process flowchart detailing the determination process performed in step S3. As described in FIG. 6, the touch IC support firmware 51 first determines whether the pen data includes data indicative of the pen coordinates or of non-detection of the pen (step S40). If it is determined that the pen coordinates are included, the touch IC support firmware 51 generates the pen control data designating the scan scenario at the time of pen detection time and the sector scan position (step S41). On the other hand, if it is determined that the data indicative of non-detection of the pen is included, the touch IC support firmware 51 generates the pen control data designating the scan scenario for non-detection of the pen and the execution of a global scan (step S42).

Here, the scan scenario at the time of pen detection is a scenario that includes pen detection with higher frequency than the scan scenario at the time of non-detection of the pen. The scenario thus increases the frequency for the touch IC 3 to receive the pen signal at the time of pen detection. This makes it possible to both detect the position of the electronic pen 7 with higher frequency and to transmit data of a larger size from the electronic pen 7 to the touch IC 3. On the other hand, upon non-detection of the pen, the touch and palm regions are acquired with higher frequency.

The touch IC support firmware 51 proceeds to retrieve the heat map from the received frame data and to derive the touch regions from the retrieved heat map (step S43). The touch IC support firmware 51 further derives the palm region based on the pen coordinates included in the received pen data and on the touch regions derived in step S43 (step S44). The deriving of the palm region has been explained above with reference to FIG. 4A. If the pen coordinates are not received, either the palm region does not have to be derived, or the touch regions whose area is equal to or larger than a predetermined value may be derived as the palm region. The touch IC support firmware 51 supplies the touch and palm regions thus derived to the operating system 52 (more specifically, to the touch driver 53) (step S45).

The touch IC support firmware 51 then generates the touch control data including the derived touch and palm regions (step S46). The touch IC support firmware 51 further generates the control content of the above-mentioned various parameters for pen detection based on the received pen coordinates and on the derived touch and palm regions and adds the generated control content to the pen control data (step S47). The touch IC support firmware 51 generates the determination data that includes the touch control data and pen control data, transmits the generated determination data to the touch IC 3 (step S48), and terminates the determination process.

Returning to FIG. 5, upon receipt of the determination data, the touch IC 3 performs processes based on the determination data in both the touch detection section 32 and the pen detection section 33 (step S4).

Figure 7:
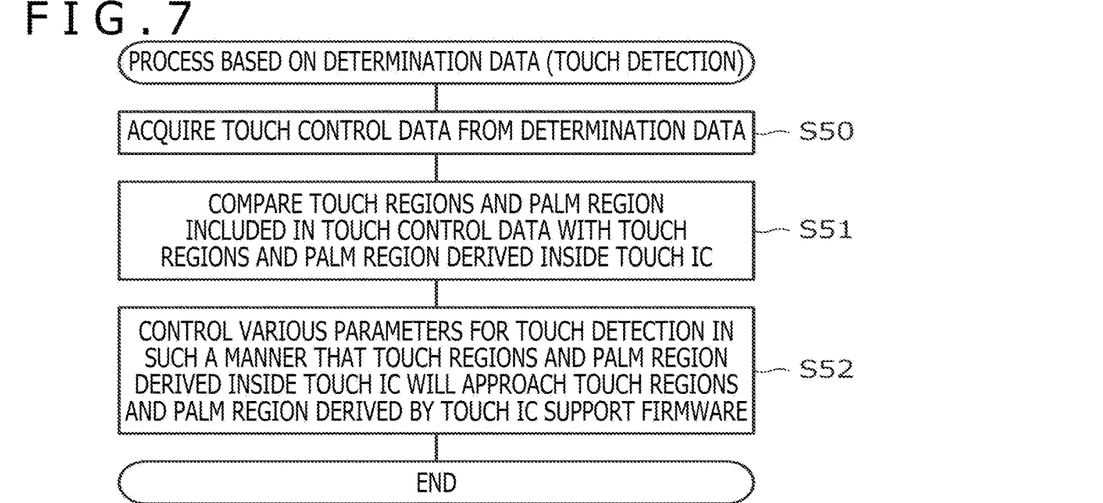
FIG. 7 is a process flowchart detailing one of determination data-based processes performed in step S4 illustrated in FIG. 5, the process being related to the touch detection.

FIG. 7 is a process flowchart detailing one of the determination data-based processes performed in step S4, the process being related to the touch detection. As described in FIG. 7, the touch detection section 32 first acquires the touch control data from the determination data (step S50). The touch detection section 32 compares the touch and palm regions included in the touch control data with the touch and palm regions derived inside the touch IC 3 (step S51). On the basis of the result of the comparison, the touch detection section 32 controls the above-described various parameters for touch detection in such a manner that the touch and palm regions derived inside the touch IC 3 are brought close to the touch and palm regions derived by the touch IC support firmware 51 (step S52). The touch detection section 32 then terminates the process.

The controls implemented in step S52 may include control for decreasing a threshold value for touch detection (threshold value of capacitance) in order to increase the sensitivity of touch detection when, for example, the touch IC support firmware 51 is detecting five fingers while the touch IC 3 detects only four fingers. The controls implemented in step S52 may further include control for increasing a threshold value for palm detection (threshold of the area) in order to facilitate palm detection when, for example, the touch IC support firmware 51 is detecting the palm while the touch IC 3 fails to detect it. Also, the touch IC support firmware 51 and the touch detection section 32 may each store beforehand multiple operation modes (e.g., a glove wearing mode, a foreign object mode (e.g., dripping hand mode where a hand is covered with water droplets), etc.) with one or more parameters for touch detection preset for each of the stored modes. The touch IC support firmware 51 may determine an optimal operation mode based on the heat map. The touch IC 3 may then control the various parameters for touch detection in a manner permitting operations in the determined operation mode. Obviously, in step S52, the other parameters mentioned above may also be controlled.

Figure 8:
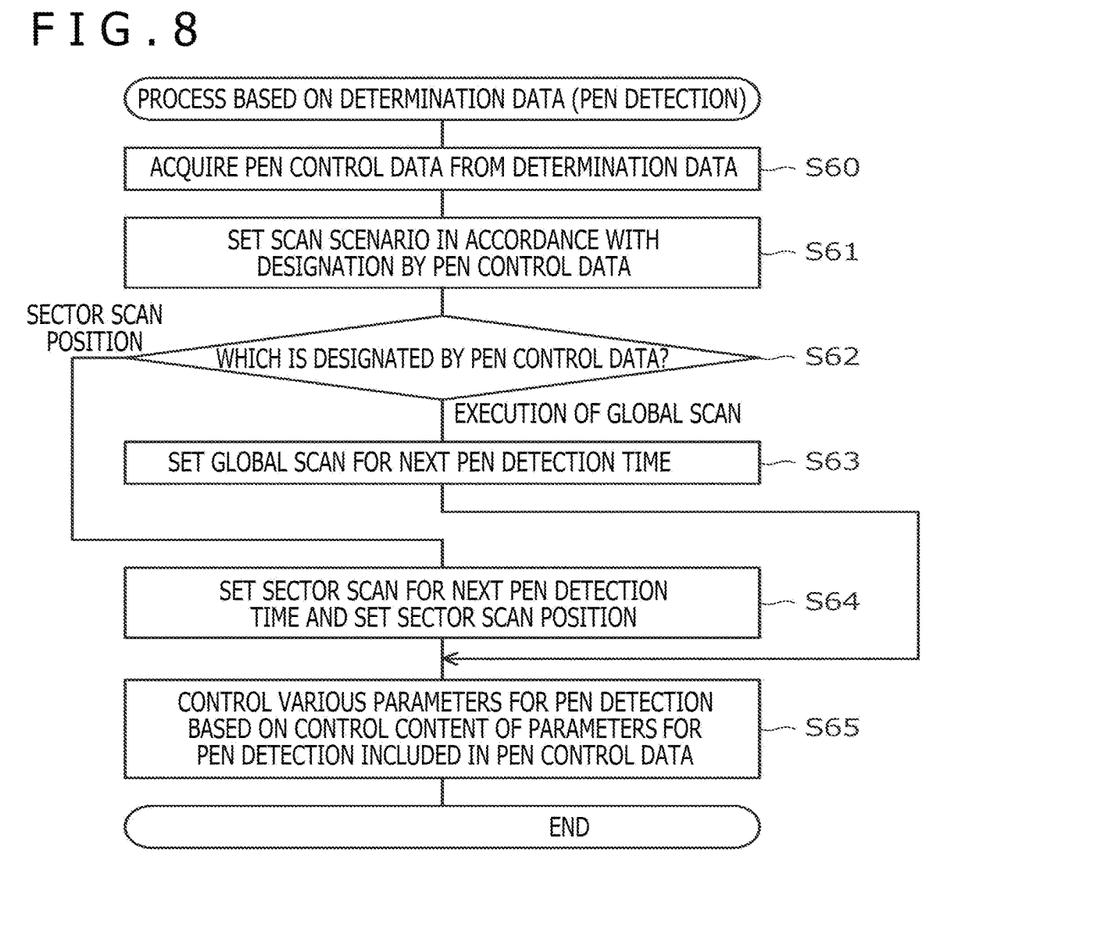
FIG. 8 is a process flowchart detailing another one of the determination data-based processes performed in step S4 illustrated in FIG. 5, the process being related to the pen detection.

FIG. 8 is a process flowchart detailing another one of the determination data-based processes performed in step S4, the process being related to the pen detection. The pen detection section 33 first acquires the pen control data from the determination data (step S60). In accordance with the designation by the acquired pen control data, the pen detection section 33 sets the scan scenario (step S61). From this point in time on, the pen detection operation and touch detection operation are carried out according to the scan scenario set in this step.

Next, the pen detection section 33 determines whether the execution of a global scan or the position of a sector scan is designated by the pen control data (step S62). If it is determined that the execution of a global scan is designated, the pen detection section 33 sets a global scan for the next pen detection time (step S63). This causes the result of the determination in step S21 of FIG. 3 to become affirmative at the next pen detection time. On the other hand, if it is determined in step S62 that the sector scan position is designated, the pen detection section 33 sets a sector scan for the next pen detection time and sets the sector scan position (step S64). This causes the result of the determination in step S21 of FIG. 3 to become negative at the next pen detection time. In step S26 of FIG. 3, the sensor electrodes targeted for the scan are determined.

Finally, the pen detection section 33 controls the various parameters for pen detection on the basis of the control content of these parameters included in the pen control data (step S65), before terminating the process. The controls implemented in step S65 may include control for increasing or decreasing a pen signal detection level for determining whether the pen signal is detected in step S23 or in step S27 of FIG. 3, or control for changing the operation ratio between the global scan and the sector scan, depending on detection or non-detection of the electronic pen 7 by the touch IC support firmware 51 and by the touch IC 3. Obviously, in step S65, the other parameters mentioned above may also be controlled.

As described above, the method carried out by the system 1 in this embodiment involves feeding the determination data, which results from the processing by the host processor 5, from the touch IC support firmware 51 back to the touch IC 3. This allows the touch IC 3 to utilize the result of the processing by the host processor 5. Consequently, the touch IC 3 is able to derive the touch and palm regions with higher accuracy and to perform the pen detection under control of the touch IC support firmware 51.

The heat map with a large data size is transmitted via the dedicated bus 4a. This makes it possible to supply the heat map from the touch IC 3 to the host processor 5 without straining the communication resources of the peripheral device bus 4b.

In this embodiment, every time the pen detection section 33 performs the pen detection, the pen data is supplied to the touch IC support firmware 51. Alternatively, if a scan scenario is adopted in which a single touch detection operation is carried out following multiple pen detection operations, only the pen data obtained as a result of the pen detection operation immediately preceding the touch detection operation may be supplied to the touch IC support firmware 51. This makes it possible to alleviate the processing burden on the touch IC support firmware 51 without affecting the determination process in step S3 of FIG. 5.

Also in this embodiment, the touch and palm regions are supplied from the touch IC support firmware 51 to the operating system 52. Alternatively, the touch IC support firmware 51 may further carry out advanced processing such as gesture recognition based on the heat map and may supply the result of the processing to the operating system 52. The result of such advanced processing may also be included in the determination data fed back to the touch IC 3. This permits more effective utilization of the touch IC support firmware 51.

In this embodiment, only the touch and palm regions derived by the touch IC support firmware 51 are included in the touch control data. Alternatively, the touch IC support firmware 51 may generate the control content of the various parameters for touch detection and may have the generated control content included in the touch control data. This makes it possible for the touch IC support firmware 51 specifically to control the various parameters for touch detection for use by the touch detection section 32.

Figure 9:
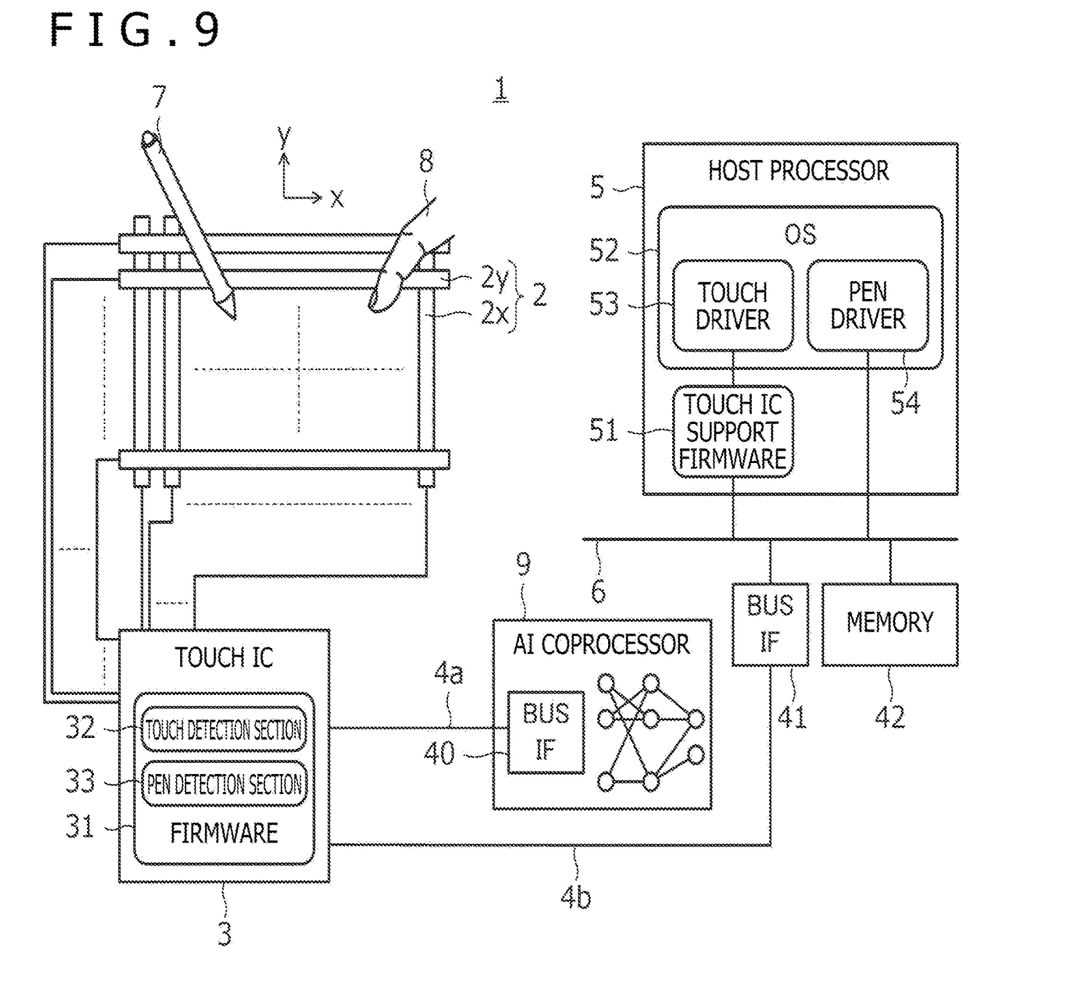
FIG. 9 is a view depicting a configuration of a system in a second embodiment of the present disclosure.

FIG. 9 is a view depicting a configuration of a system 1 in a second embodiment of the present disclosure. The system 1 in the second embodiment differs from the system 1 of the first embodiment in that an AI coprocessor 9 provided apart from the host processor 5 is used as a processor external to the touch IC 3 and in that the pen data is not supplied to the AI coprocessor 9 serving as the external processor. The other aspects of the two systems are substantially the same. Thus, the components of the system 1 in the second embodiment that are similar to those of the system 1 in the first embodiment are designated by like reference signs. The ensuing paragraphs will mainly explain the differences of the system 1 in the second embodiment from the system 1 in the first embodiment.

As illustrated in FIG. 9, the system 1 in the second embodiment is configured with the AI coprocessor 9. The touch IC support firmware 51 depicted in FIG. 1 is not provided in the system 1 of the second embodiment. The bus interface 40 is included in the AI coprocessor 9 and is not connected with the internal bus 6.

The AI coprocessor 9 is an auxiliary processor that incorporates artificial intelligence. The AI coprocessor 9 is connected to the touch IC 3 via the dedicated bus 4*a*. The AI coprocessor 9 plays the role of receiving from the touch IC 3 the frame data including the heat map, of deriving the touch coordinates and palm coordinates from the received heat map, and of feeding the determination data including the derived touch and palm coordinates back to the touch IC 3 via the dedicated bus 4*a*.

The touch detection section 32 in the second embodiment is configured to retrieve the touch and palm coordinates from the feedback determination data and to report the retrieved touch and palm coordinates to the host processor 5 via the peripheral device bus 4*b*. In this manner, the host processor 5 can acquire the touch and palm regions derived by the AI coprocessor 9 without communicating with the AI coprocessor 9. That is, the AI coprocessor 9 is hidden from the viewpoint of the host processor 5. This means the AI coprocessor 9 as an external processor may be additionally implemented without having to change the configuration of the host processor 5.

Figure 10:
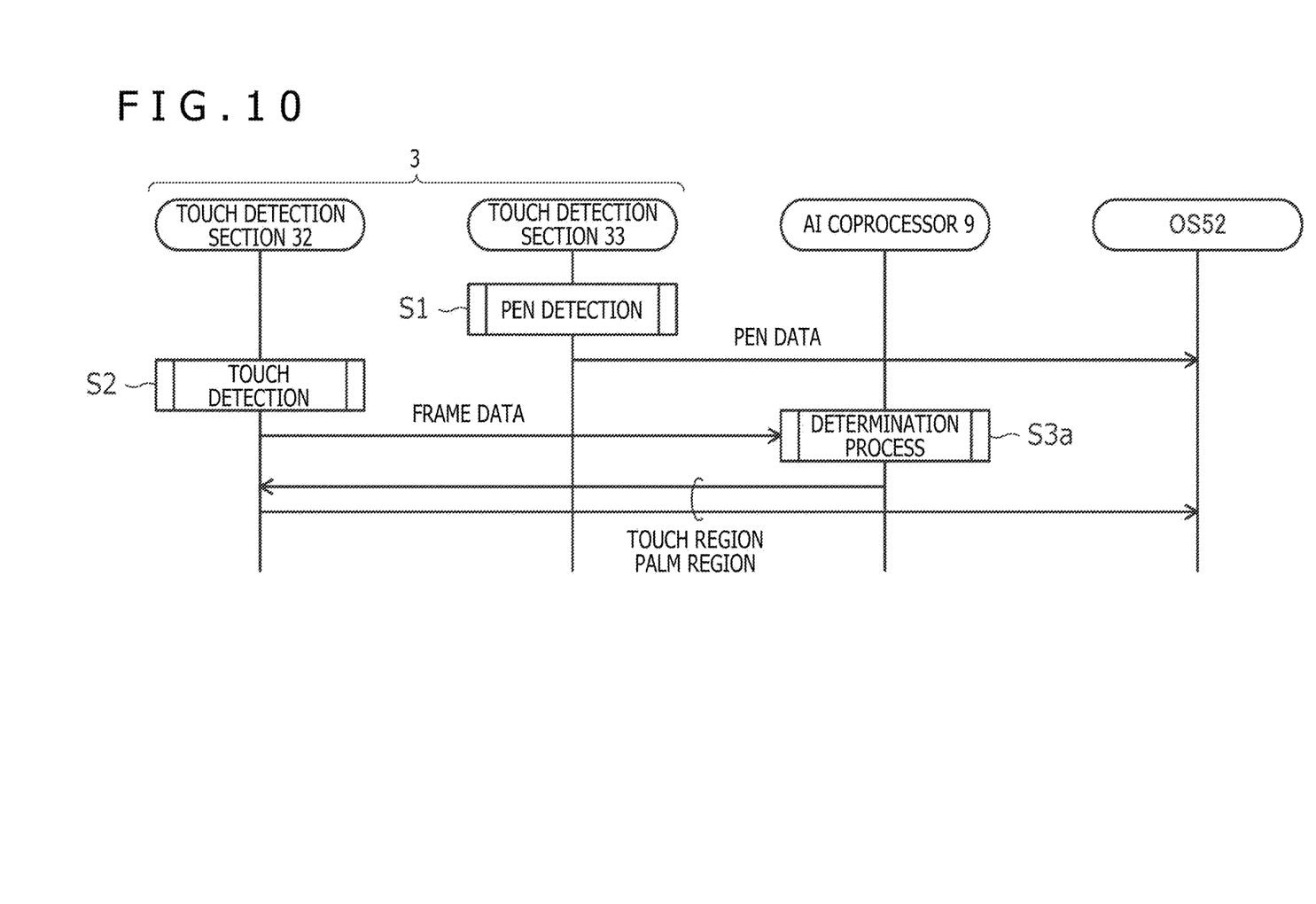
FIG. 10 is a sequence diagram depicting the operations of the system illustrated in FIG. 9.

FIG. 10 is a sequence diagram depicting the operations of the system 1 in the second embodiment. In the second embodiment, as depicted in FIG. 10, the pen data resulting from the pen detection (step S1) by the pen detection section 33 is supplied only to the operating system 52 (more specifically, to the pen driver 54) and not to the AI coprocessor 9. Further, the determination process performed in step S3*a* replaces the determination process of step S3.

Figure 11:
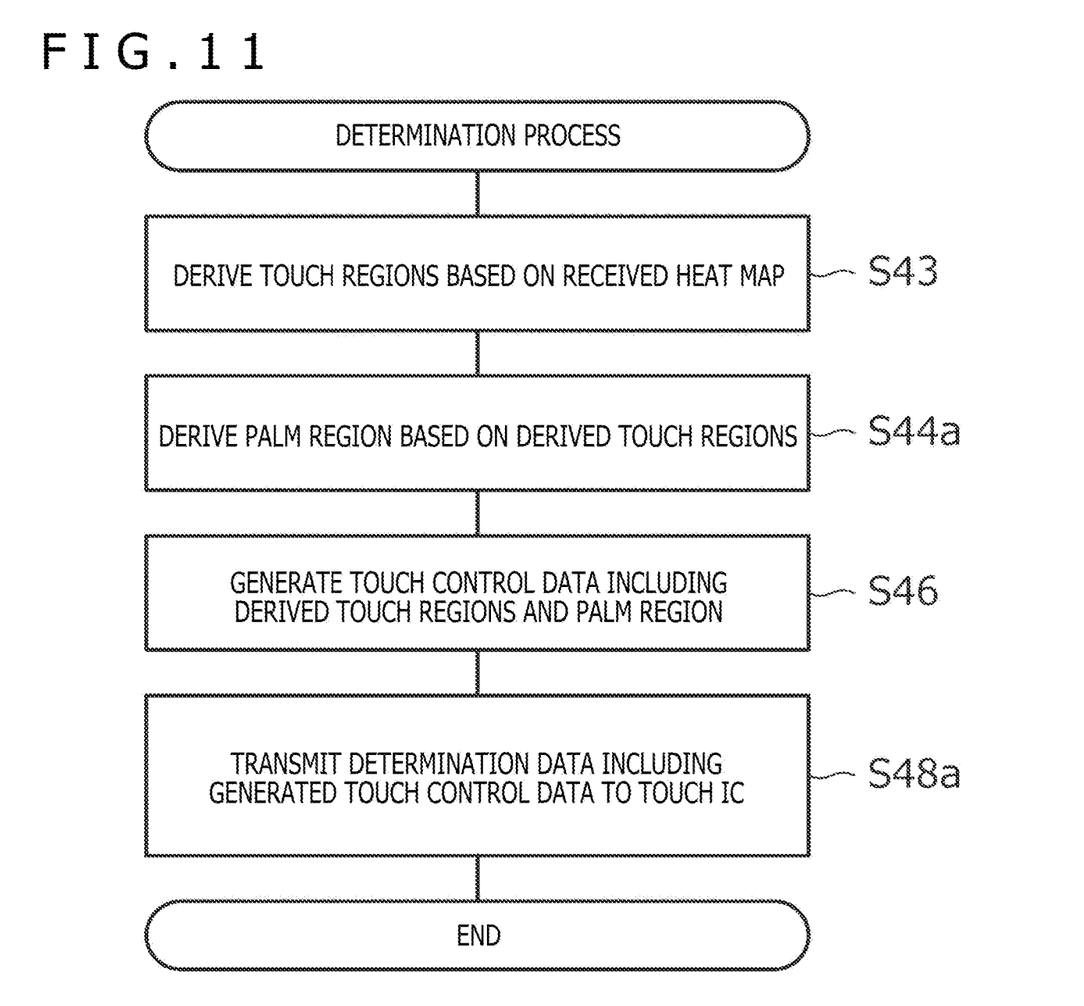
FIG. 11 is a process flowchart detailing a determination process performed in step S3a illustrated in FIG. 10.

FIG. 11 is a process flowchart detailing the determination process performed in step S3*a*. As described in FIG. 11, the determination process performed in step S3*a* is a process in which steps S40 to S42, S45, and S47 are omitted from the determination process described in FIG. 6, with steps S44 and S48 replaced by steps S44*a* and S48*a*, respectively.

Step S44*a* differs from step S44 in FIG. 6 in that the pen coordinates are not used. That is, the AI coprocessor 9 is configured to derive the palm region solely on the basis of the touch regions derived in step S43. Specifically, the touch regions of which the area is equal to or larger than a predetermined value may be derived as the palm region, for example. Step S48*a* differs from step S48 in FIG. 6 in that the pen control data is not included in the determination data.

Returning to FIG. 10, the touch detection section 32 reports the touch and palm regions included in the determination data received from the AI coprocessor 9 to the host processor 5 as the touch and palm regions derived by the touch detection section 32 itself. This makes it possible to add the AI coprocessor 9 as an external processor without having to change the configuration of the host processor 5.

As explained above, according to the method carried out by the system 1 of the second embodiment, the touch and palm coordinates derived by the AI coprocessor 9 are supplied to the host processor 5 via the touch IC 3. Thus, the external processor can be added with no change in the configuration of the host processor 5.

The touch detection section 32 in the second embodiment may also carry out the process described in FIG. 7. In this manner, the touch IC 3 of the second embodiment is able to derive the touch and palm regions with higher accuracy.

In the second embodiment, the pen data resulting from the pen detection (step S1) by the pen detection section 33 may also be supplied to the AI coprocessor 9. This enables the pen detection section 33 in the second embodiment to perform the pen detection under control of the host processor 5. It is also possible for the AI coprocessor 9 to derive the palm region based on the pen coordinates.

Also in the second embodiment, the AI coprocessor 9 may perform advanced processing such as gesture recognition based on the heat map and may have the result of the processing included in the determination data fed back to the touch IC 3. In this case, the touch IC 3 may preferably report the feedback result of the advanced processing to the host processor 5. This permits more effective utilization of the AI coprocessor 9.

The present disclosure is not limited to the preferred embodiments discussed above and may be implemented in diverse variations so far as they are within the scope of the appended claims or the equivalents thereof.

What is claimed is:

1. A touch sensor comprising:
a sensor electrode group; and
a touch integrated circuit coupled to the sensor electrode group for executing touch detection and configured to generate frame data indicative of a detection level of each of two-dimensional positions in the sensor electrode group, wherein the touch integrated circuit is connected to an external processor different from the touch integrated circuit via a first bus, the touch integrated circuit supplies the frame data to the external processor via the first bus, the external processor feeds determination data resulting from performing predetermined processing on the frame data back to the touch integrated circuit, and the touch integrated circuit performs an operation based on the determination data.

2. The touch sensor according to claim 1, wherein the external processor feeds the determination data back to the touch integrated circuit via the first bus.

3. The touch sensor according to claim 1, wherein the determination data includes a touch region or a palm region derived by the external processor on a basis of the frame data, and the touch integrated circuit controls various parameters for touch detection based on the touch region or the palm region fed back from the external processor.

4. The touch sensor according to claim 3, wherein the touch integrated circuit controls the various parameters for touch detection in such a manner that the touch region or the palm region derived by the touch integrated circuit on the basis of the frame data is brought close to the touch region or the palm region derived by the external processor.

5. The touch sensor according to claim 3, wherein the various parameters for touch detection include at least a parameter for controlling content of a touch detection signal, a parameter for controlling a region targeted for touch detection, a parameter for controlling at least one sensor electrode in the sensor electrode group for use in touch detection, a parameter for determining a tracking target in a multiple-touch case, a parameter for controlling a method of determining the palm region, or a parameter for controlling content of data to be transmitted to a host processor.

6. The touch sensor according to claim 1, wherein the touch integrated circuit performs pen detection to detect a signal transmitted from a pen on a basis of electrical charges induced in the sensor electrode group, the determination data includes pen control data for controlling an operation of the pen detection, the touch integrated circuit determines whether a global scan or a sector scan is to be performed at the next pen detection time on a basis of the pen control data fed back from the external processor, and in response to determining that the sector scan is to be performed, the touch integrated circuit selects at least one sensor electrode from the sensor electrode group for use in pen detection on the basis of the pen control data fed back from the external processor.

7. The touch sensor according to claim 6, wherein the touch integrated circuit further controls an execution ratio between the pen detection and the touch detection on the basis of the pen control data fed back from the external processor.

8. The touch sensor according to claim 1, wherein the touch integrated circuit performs pen detection to detect a signal transmitted from a pen on a basis of electrical charges induced in the sensor electrode group, the pen detection includes generating pen data regarding the pen, the touch integrated circuit supplies the pen data to the external processor in addition to the frame data, and the external processor derives a palm region using the frame data and the pen data.

9. The touch sensor according to claim 8, wherein the pen data includes pen coordinates indicating a position of the pen.

10. The touch sensor according to claim 1, wherein the external processor is an artificial intelligence coprocessor for assisting the touch integrated circuit, the touch integrated circuit is connected to a host processor via a second bus, and the touch integrated circuit reports touch coordinates included in the determination data to the host processor via the second bus.

11. The touch sensor according to claim 10, wherein the touch integrated circuit further performs pen detection to detect a signal transmitted from a pen on a basis of electrical charges induced in the sensor electrode group, and the touch integrated circuit reports pen coordinates indicating a position of the pen and generated by the pen detection to the host processor via the second bus.

12. A system, comprising:

a sensor electrode group;

a touch integrated circuit coupled to the sensor electrode group for executing touch detection and configured to generate frame data indicative of a detection level of each of two-dimensional positions in the sensor electrode group;

an external processor different from the touch integrated circuit; and a first bus connecting the touch integrated circuit to the external processor, wherein the touch integrated circuit supplies the frame data to the external processor via the first bus, the external processor feeds determination data resulting from performing predetermined processing on the frame data back to the touch integrated circuit, and the touch integrated circuit performs an operation based on the determination data.

13. The system according to claim 12, wherein the external processor feeds the determination data back to the touch integrated circuit via the first bus.

14. The system according to claim 12, wherein the determination data includes a touch region or a palm region derived by the external processor on a basis of the frame data, and the touch integrated circuit controls various parameters for touch detection based on the touch region or the palm region fed back from the external processor.

15. The system according to claim 14, wherein the touch integrated circuit controls the various parameters for touch detection in such a manner that the touch region or the palm region derived by the touch integrated circuit on the basis of the frame data is brought close to the touch region or the palm region derived by the external processor.

16. The system according to claim 14, wherein the various parameters for touch detection include at least a parameter for controlling content of a touch detection signal, a parameter for controlling a region targeted for touch detection, a parameter for controlling at least one sensor electrode in the sensor electrode group for use in touch detection, a parameter for determining a tracking target in a multiple-touch case, a parameter for controlling a method of determining the palm region, or a parameter for controlling content of data to be transmitted to a host processor.

17. The system according to claim 12, wherein
the touch integrated circuit performs pen detection to detect a signal transmitted from a pen on a basis of electrical charges induced in the sensor electrode group,
the determination data includes pen control data for controlling an operation of the pen detection,
the touch integrated circuit determines whether a global scan or a sector scan is to be performed at the next pen detection time on a basis of the pen control data fed back from the external processor, and
in response to determining that the sector scan is to be performed, the touch integrated circuit selects at least one sensor electrode from the sensor electrode group for use in pen detection on the basis of the pen control data fed back from the external processor.

18. The system according to claim 17, wherein the touch integrated circuit further controls an execution ratio between the pen detection and the touch detection on the basis of the pen control data fed back from the external processor.

19. The system according to claim 12, wherein
the touch integrated circuit performs pen detection to detect a signal transmitted from a pen on a basis of electrical charges induced in the sensor electrode group,
the pen detection includes generating pen data regarding the pen,
the touch integrated circuit supplies the pen data to the external processor in addition to the frame data, and
the external processor derives a palm region using the frame data and the pen data.

20. The system according to claim 19, wherein the pen data includes pen coordinates indicating a position of the pen.

\* \* \* \* \*